(12) United States Patent
Malkamäki et al.

(10) Patent No.: US 10,626,746 B2
(45) Date of Patent: Apr. 21, 2020

(54) CONTROLLABLE TWO-SPOOL GAS TURBINE ARRANGEMENT

(71) Applicant: AURELIA TURBINES OY, Lahti (FI)

(72) Inventors: Matti Malkamäki, Berlin (DE); Jari Backman, Lappeenranta (FI); Juha Honkatukia, Lapeenranta (FI); Ahti Jaatinen-Värri, Lappeenranta (FI)

(73) Assignee: AURELIA TURBINES OY, Lahti (FI)

( * ) Notice: Subject to any disclaimer, the term of this patent is extended or adjusted under 35 U.S.C. 154(b) by 0 days.

(21) Appl. No.: 15/561,187

(22) PCT Filed: Mar. 23, 2016

(86) PCT No.: PCT/FI2016/050183
§ 371 (c)(1),
(2) Date: Sep. 25, 2017

(87) PCT Pub. No.: WO2016/151199
PCT Pub. Date: Sep. 29, 2016

(65) Prior Publication Data
US 2018/0051584 A1  Feb. 22, 2018

(30) Foreign Application Priority Data
Mar. 23, 2015 (GB) .................... 1504837.4

(51) Int. Cl.
*F01D 15/10* (2006.01)
*F02C 6/00* (2006.01)
*F02C 7/36* (2006.01)

(52) U.S. Cl.
CPC .............. *F01D 15/10* (2013.01); *F02C 6/00* (2013.01); *F02C 6/003* (2013.01); *F02C 7/36* (2013.01);
(Continued)

(58) Field of Classification Search
CPC ........ F01D 13/003; F01D 15/10; F02C 3/085; F02C 6/00; F02C 6/003; F02C 6/02;
(Continued)

(56) References Cited

U.S. PATENT DOCUMENTS 2,709,893 A * 6/1955 Birmann ................... F02C 3/05
                                                    415/115
4,756,673 A * 7/1988 Miyashita ............... F01D 25/14
                                                    417/400
(Continued)

FOREIGN PATENT DOCUMENTS

EP        0798454      10/1997
EP        2579430 A2    4/2013
(Continued)

OTHER PUBLICATIONS

UK Intellectual Property Office; Search Report issued in GB1504837.4, dated Sep. 21, 2015.

*Primary Examiner* — Tulsidas C Patel
*Assistant Examiner* — S. Mikailoff
(74) *Attorney, Agent, or Firm* — Berggren LLP

(57) ABSTRACT

The invention concerns land-based gas turbine plants with a two-spool gas turbine arrangement for generating electrical power. The invention comprises two spools. The first spool comprises a first shaft, a first compressor and a first turbine. The second spool comprises at least a second shaft and a second turbine. The shafts of the first and the second spools are independently rotatable of each other. The invention further comprises the first generator and the second generator having nominally substantially equal power ratings, and the rotating parts of the first generator and the second generator have nominally substantially equal rotational speed ratings, and at least 60 percent of a total output power
(Continued)

supplied to said load in a form of electrical and rotational power is generated by the two electrical generators.

13 Claims, 4 Drawing Sheets

(52) U.S. Cl.
CPC .. *F05D 2220/764* (2013.01); *F05D 2220/766* (2013.01)

(58) Field of Classification Search
CPC .... F02C 6/203; F02C 7/08; F02C 7/36; F05D 2220/32; F05D 2220/764; F05D 2220/766; F05D 2240/60; H02K 7/1823
See application file for complete search history.

(56) References Cited

U.S. PATENT DOCUMENTS

| | | | | |
|---|---|---|---|---|
| 4,800,717 A * | 1/1989 | Rodgers | ............... | F01D 5/046 415/115 |
| 4,926,630 A * | 5/1990 | Shekleton | ............... | F02C 3/05 60/758 |
| 4,991,390 A * | 2/1991 | Shah | ............... | F01D 5/188 415/115 |
| 5,313,782 A | 5/1994 | Frutschi et al. | | |
| 6,294,842 B1 * | 9/2001 | Skowronski | ............... | F01D 15/10 290/7 |
| 7,250,690 B2 * | 7/2007 | Yang | ............... | F01D 15/10 290/40 B |
| 7,559,745 B2 * | 7/2009 | Falk | ............... | F04D 29/284 416/188 |
| 8,049,353 B1 | 11/2011 | Eng et al. | | |
| 8,865,356 B2 * | 10/2014 | Berntsen | ............... | H01M 8/04014 429/400 |
| 9,520,757 B2 * | 12/2016 | Hino | ............... | F01D 15/10 |
| 2002/0152754 A1 | 10/2002 | MacKay | | |
| 2005/0056021 A1 * | 3/2005 | Belokon | ............... | F02C 3/113 60/772 |
| 2007/0130952 A1 * | 6/2007 | Copen | ............... | F02C 6/02 60/772 |
| 2007/0241722 A1 * | 10/2007 | Yang | ............... | F01D 15/10 322/20 |
| 2008/0018109 A1 * | 1/2008 | Campanile | ............... | F02C 6/18 290/2 |
| 2009/0072624 A1 * | 3/2009 | Towada | ............... | G06F 11/2015 307/65 |
| 2011/0156394 A1 * | 6/2011 | Klusman | ............... | F16C 17/024 290/52 |
| 2012/0000204 A1 * | 1/2012 | Kesseli | ............... | F02C 3/107 60/778 |
| 2012/0223531 A1 * | 9/2012 | Brooks | ............... | F01D 15/10 290/1 R |
| 2012/0324903 A1 * | 12/2012 | Dewis | ............... | F02C 7/143 60/772 |
| 2013/0056982 A1 * | 3/2013 | Gozdawa | ............... | F01D 15/10 290/7 |
| 2013/0175805 A1 * | 7/2013 | Berntsen | ............... | H01M 8/04014 290/1 A |
| 2013/0232941 A1 | 9/2013 | Huang | | |
| 2013/0249213 A1 * | 9/2013 | Oesterheld | ............... | H02P 9/08 290/31 |
| 2014/0000270 A1 * | 1/2014 | Dobbeling | ............... | F02C 3/04 60/772 |
| 2014/0244056 A1 * | 8/2014 | Pena | ............... | F02C 1/00 700/287 |
| 2015/0240719 A1 * | 8/2015 | Kraft | ............... | F02C 6/00 290/52 |
| 2017/0077750 A1 * | 3/2017 | Hino | ............... | F01D 15/10 |
| 2018/0051584 A1 * | 2/2018 | Malkamaki | ............... | F01D 15/10 |
| 2018/0058242 A1 * | 3/2018 | Malkamaki | ............... | F01D 13/003 |
| 2018/0058320 A1 * | 3/2018 | MacNaghten | ............... | F02C 6/16 |
| 2018/0252158 A1 * | 9/2018 | Malkamaki | ............... | F02C 1/06 |

FOREIGN PATENT DOCUMENTS

| | | |
|---|---|---|
| GB | 2450778 A | 1/2009 |
| GB | 2508998 A | 6/2014 |
| RU | 2549743 C1 | 4/2015 |

* cited by examiner

CONTROLLABLE TWO-SPOOL GAS TURBINE ARRANGEMENT

PRIORITY

This application is a U.S. national application of PCT-application PCT/FI2016/050183 filed on Mar. 23, 2016 and claiming priority of UK national application GB 1504837.4 filed on Mar. 23, 2015, the contents of both of which are incorporated herein by reference.

TECHNICAL FIELD

The invention concerns in general the technical field of electrical power generation by utilizing gas turbine plants. Especially, the invention concerns land based stationary gas turbine plants—or marine-based gas turbine plants with a two-spool gas turbine arrangement for generating electrical power to supply a load.

BACKGROUND

The electrical energy production is at the moment going through major changes. The pollution and greenhouse gas emissions of the energy sector have gained increasing attention. At the same time as the electrical energy production is moving towards renewable energy based energy production, the electrical grid is also facing new challenges. Previously, the power plants connected to the electrical grid were very large such as nuclear power plants, large coal-based power plants, etc. This centralized electrical power generation, of course, causes losses in the electrical grid because the energy must be transferred over long distances.

Distributed power generation is closer to the consumption and thus smaller losses occur in the electrical grid due to shorter distances over which the energy is being transferred compared to centralized power generation. In contrast to the centralized power generation plants which typically operate at their rated power, the distributed power generation plants have to be able to constantly adjust their operation and output power based on load demand. This is especially important if the electrical grid seizes to feed or receive power such as in case of islanding conditions during which the power generation and power consumption must be equal typically in a rather small area wherein the electrical grid is typically weak. In these cases, the operation is entirely relying on the control and operation of a single power generation unit or few power generation units. It is, therefore, of utmost importance to have power plants which can run at high efficiency also at part-load conditions and can adjust their output rapidly.

One major reason why the amount of distributed energy production has not increased more is the higher price of the energy produced by these systems compared to, e.g., price of the electricity from the grid. This is typically due to a lower electrical efficiency compared to large power plants. Gas engine and gas turbine plants, which are more and more being used in the electrical energy production, are good examples of power plants that can be utilized in distributed power generation.

Gas turbine plants are typically designed to operate at 100 percent of the nominal load, i.e. the design point. Nowadays, the electrical production efficiencies of commercial gas turbines at their design points are at the most around 40 percent, especially, in the plants with electrical power rating less than 20 megawatts. The electrical efficiency which itself is not very high, quickly decreases if the gas turbine is being operated at part-load conditions, i.e., at load conditions less than 100 percent of the nominal load.

A typical gas turbine power plant comprises a compressor, a combustor, a turbine and an electrical generator. The compressor and the turbine are mounted on the same shaft and form a single spool. The generator is also mounted on the shaft. Some prior art, however, describes solutions with gas turbines having two spools. Two-spool arrangement offers potentially better efficiency than a single-spool system because more power can be produced with the same turbine inlet temperature compared to a single-spool system.

Typically the two spools of the gas turbines are different in a way that there is a high pressure spool and a low pressure spool. Low pressure spool is typically connected to the main electrical generator while the high pressure spool is operating as a gas compressing spool. These kinds of two-spool designs are available from approximately 15 megawatts and upwards. In these two-spool designs, the designing of turbine impellers may become more challenging due to their size and effect on the rotor dynamics. The high ratio at which the speed of the spools changes relative to each other further complicates the design and control of the system.

In some attempted solutions of the gas turbine plants, two spools have been utilized wherein both of the spools have electrical generators coupled to their shafts. In these solutions, the power taken out of the gas turbine plant has been taken mainly from a single electrical generator, that is a main generator, and the other generator has been working as an auxiliary motor/generator, typically having lower power rating than the main generator and having a rotational speed at different speed range than the main generator. There are also solutions in which both of the electrical generators have been used primarily for controlling the operation of the gas turbine plant, thus both of the generators being auxiliary motors/generators, while the power taken out of the gas turbine plant is mainly taken from an additional free turbine spool to which an additional generator, operating in these cases as the main generator, is connected to.

The high speed of the spools, in general, may introduce difficulties and wears off bearings quickly and causes high losses due to friction. Especially in distributed power generation, the output power of the power generation plant must be able to be changed rapidly. In typical gas turbines, the control may not be sufficiently rapid to react on all load changes or changes in outputs of other power generation plants. In gas turbines, control capabilities can be affected by designing, e.g., the dynamical properties related to blades and impellers as well as the structure and control of the generators.

SUMMARY

An objective of the invention is to present an arrangement to alleviate one or more of the above disadvantages related to electrical energy production using gas turbines, particularly, to provide high efficiency also at part-load conditions. The objectives of the invention are reached by the arrangement as defined by the respective independent claim. The preferred embodiments of the invention are disclosed in the dependent claims.

According to a first aspect of the invention, a stationary land-based or marine-based gas turbine arrangement for generating electrical power to supply a load, wherein said load is external with respect to the arrangement, is provided. The arrangement comprises two spools: a second spool including a second shaft, a second compressor for compressing inlet gas and a second turbine mounted on the second shaft; and a first spool including a first shaft, a first compressor for further compressing compressed gas from the second compressor and a first turbine mounted on the first shaft. The arrangement further comprises a first combustor operable to combust or react a mixture of fuel so that further compressed gas from the first compressor turns into gas with elevated temperature that is expanded in the first turbine to produce mechanical power. The arrangement comprises the second turbine being arranged to receive expanded gas with elevated temperature from the first turbine and to further expand said expanded gas with elevated temperature to produce mechanical power, the second spool being rotatable independently of the first spool. The first compressor is arranged to receive said compressed gas from the second compressor and to further compress said compressed gas, the first spool being rotatable independently of the second spool. The arrangement comprises also only two electrical generators: a first generator directly coupled to the first shaft to be rotatably driven thereby, the first generator rotating at the same speed as the first shaft and operable to generate an alternating electrical current arranged to be supplied to said load; and a second generator directly coupled to the second shaft to be rotatably driven thereby, the second generator rotating at the same speed as the second shaft and operable to generate an alternating electrical current arranged to be supplied to said load. The arrangement also comprises the first generator and the second generator having nominally substantially equal power ratings and the rotating parts of the first generator and the second generator have nominally substantially equal rotational speed ratings. Furthermore, the arrangement comprises at least 60 percent of a total output power supplied to said load in a form of electrical and rotational power being generated by the two electrical generators, wherein the total output power is a sum of electrical and rotational power supplied to said load by the arrangement.

Especially the invention relate to above mentioned arrangement in combination with a stationary land based gas turbine plant or a marine-based gas turbine plant, that is, specifically the invention concerns stationary land based— or marine-based gas turbine plants with a multi-spool gas turbine arrangement for generating electrical power to supply of an external load.

Said load external with respect to the arrangement and into which said load the electrical power is to be supplied may be an electrical grid or a stand-alone electrical load such as an electrical supply system of a hospital or an industrial plant or a residential load.

Marine based gas turbine plants may be used also in combination with an electrical supply system of a ship and/or an electrical motor part of a marine propulsion system of a ship.

The arrangement may comprise a first heat exchanger arranged to receive the said further compressed gas from the first compressor and further expanded gas with elevated temperature from the second turbine, the first heat exchanger causing heat transfer from the said further expanded gas with elevated temperature to the said further compressed gas so as to pre-heat the said further compressed gas prior to combustion in the first combustor.

The arrangement may comprise a second heat exchanger arranged to receive said compressed gas to be transferred to the first compressor and cooling medium from an external source so as to decrease the temperature of the said compressed gas.

The arrangement may comprise a second combustor operable to combust or react a mixture of fuel, the second combustor arranged to re-heat said expanded gas with elevated temperature and, after re-heating, to transfer said expanded gas with elevated temperature into the second turbine.

The arrangement may comprise the first compressor and the first turbine being mounted on the first shaft and separated from each other only by a planar element placed between the first compressor and the first turbine wherein a plane defined by the planar element is perpendicular to a longitudinal axis of the first shaft.

The arrangement may comprise the second compressor and the second turbine being mounted on the second shaft and separated from each other only by a planar element placed between the second compressor and the second turbine wherein a plane defined the planar element is perpendicular to a longitudinal axis of the second shaft.

The arrangement may comprise a planar element being a partially hollow planar element arranged so that air can flow inside the partially hollow planar element providing cooling for the partially hollow planar element.

The arrangement may comprise the first combustor and/or the second combustor being externally fired combustors.

The arrangement may further comprise an auxiliary system comprising an energy source for operating the gas turbine plant arrangement during predefined (pre-thought) abnormal conditions such as an interruption in the electrical grid or in a case of a planned maintenance outage.

The arrangement may comprise the first combustor comprising an ignition system and a fuel injection system.

The arrangement may comprise a control system for controlling an operation of the gas turbine plant arrangement.

The arrangement may comprise the first compressor and/or the second compressor being centrifugal compressors.

The arrangement may comprise the first turbine and/or the second turbine being radial turbines.

The arrangement may comprise a burner arranged in fluid communication with the gas turbine arrangement wherein said further expanded gas with elevated temperature from the second turbine or said gas at elevated temperature from the first heat exchanger are being utilized in the burner.

The arrangement may comprises a heat utilization process arranged in fluid communication with the gas turbine arrangement wherein the cooling medium from the second heat exchanger, if water, is injected to the heat utilization process and utilized for heating.

The arrangement may comprise the first generator and the second generator have nominally substantially equal power ratings differing at most ten percent from each other relative to power rating of the generator with higher nominal power rating, and the rotating parts of the first generator and the second generator have nominally substantially equal rotational speed ratings differing at most ten percent from each other relative to speed rating of the generator with higher nominal speed rating.

The arrangement may comprise at least part of the alternating electrical current arranged to be utilized in self-consumption of the arrangement such as for operating the control system or the active magnetic bearings.

An advantage of the arrangement according to the present invention is that the suggested two-spool arrangement provides independent control of the electrical output of the generators and thus the system can be utilized more efficiently than a single-spool system. Because both of the generators have substantially equal power ratings and the rotational speed of the rotating parts of the generators are also substantially equal, the changes in the speed of one generator do not cause large changes in another. This will ease the design of the operation and control of the system. Furthermore, because the sizes of the generators are substantially equal, the rotational speed of neither becomes particularly high which leads to lower energy losses compared to a solution with two significantly different sized generators. As a further advantage, the size of the impeller of the low pressure turbine, i.e. the second turbine is smaller than in case of a typical gas turbine with high speed high pressure spool and a low pressure spool rotating significantly slower. This will further facilitate the design of dynamical properties related to low pressure spool.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

The terms "first" and "second" are herein used to distinguish one element from another element, and not to specially prioritize or order them, if not otherwise explicitly stated.

Similar kind of approach may be also to provide electrical power to an electrical motor of a train or heavy machinery. However there may be then dissimilar advantages because of difference in power demand from gas turbines.

BRIEF DESCRIPTION OF FIGURES

The embodiments of the invention are illustrated by way of example, and not by way of limitation, in the figures of the accompanying drawings.

DETAILED DESCRIPTION

Figure 1:
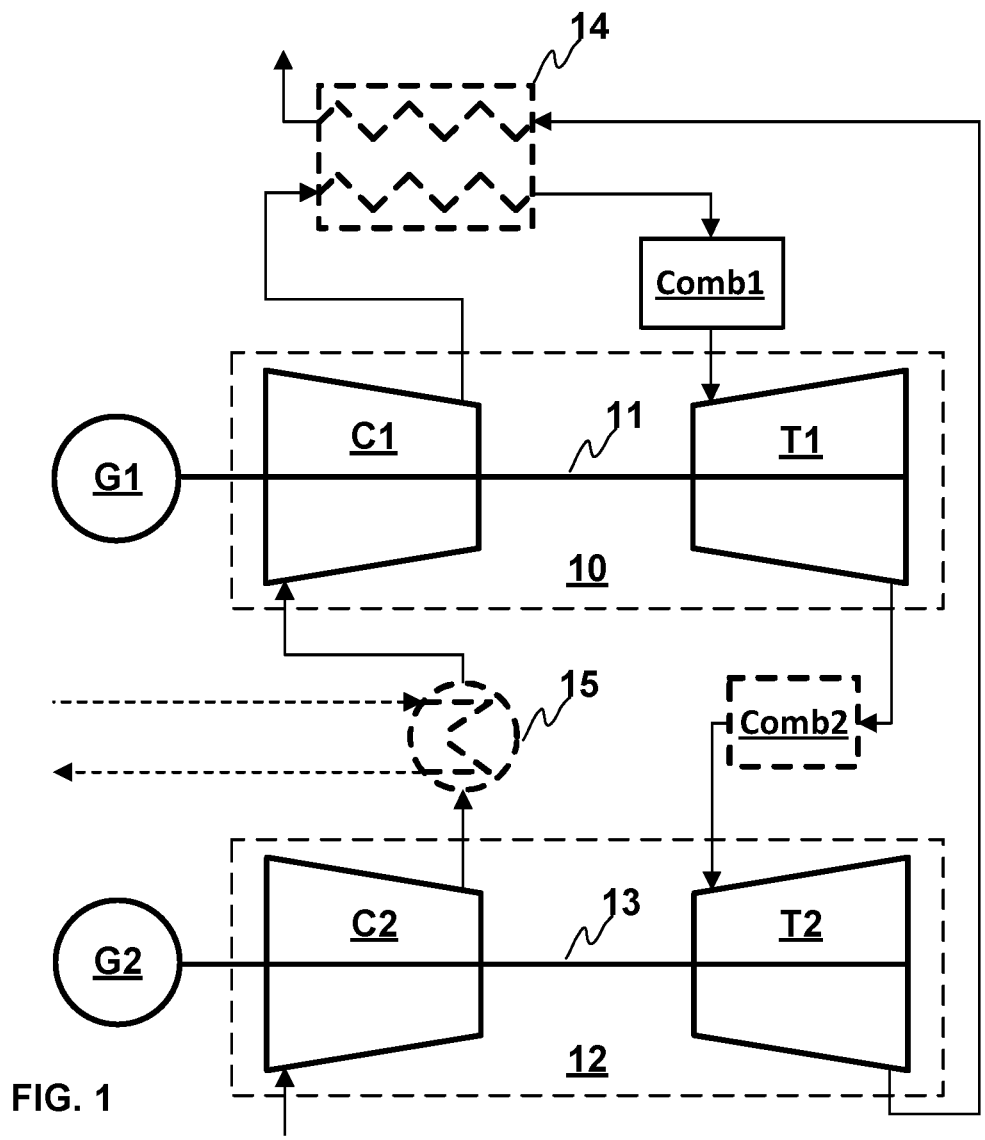
FIG. 1 illustrates schematically a gas turbine arrangement according to an embodiment of the present invention.

The present invention relates preferably to an arrangement for producing electrical power to supply a load by utilizing stationary land based gas turbines in combination with a stationary land based gas turbine plant. The present disclosure contain also a marine-based gas turbines to be used in marine-based gas turbine plants. Land-based gas turbines refer to any stationary application utilizing gas turbines on land for producing electrical power such as power plants connected to an electrical grid or to a stand-alone electrical load such as an electrical supply system of a hospital or an industrial plant or a residential load. Marine-based gas turbines for producing electrical power refer to gas turbines which are used in marine applications for producing electrical power, for example in a marine-based gas turbine plant.

The compressors used in the embodiments according to the present invention may, preferable, be of the centrifugal type but may also be of the axial type or any other type capable of increasing the pressure of the fluid flowing through the compressor. The materials used in the compressors and, especially, in their blades may be, e.g. but not limited to, aluminum, titanium alloys or martensitic steel alloys. There may also be specific coatings to improve erosion resistance of the blades and enabling higher temperature to be utilized.

The turbines used in the embodiments according to the present invention may, preferably, be of the radial type but may also be of the axial type or any other type capable of letting the fluid flowing through the turbines and thus to produce mechanical power. The materials used in the turbines and, especially, in their blades may be, e.g. but not limited to, iron- or nickel-based alloys being produced by utilizing either conventional ingot metallurgy or powder metallurgy. Also ceramic materials may be used in the turbines. There may also be specific coatings to improve erosion resistance of the blades and enabling higher temperature to be utilized.

The heat exchangers used in the embodiments according to the present invention may, preferable, be of the counter-current flow type but may also be any other kind of a heat exchanger operable to transfer the heat from a heat source with higher temperature to the air coming into the heat exchanger. The heat source with higher temperature may be, e.g., hot gas leaving from some of the turbines. Heat exchangers may also be used to cool the air in the gas turbine by using a cooling medium with lower temperature to remove some of the heat in the air flowing in the gas turbine. The cooling medium used may be, e.g., liquid such as water or any other fluid. Materials used in the production of heat exchangers may be any material withstanding the elevated temperatures and pressures and having typically high thermal conductivities. These may be, e.g. but not limited to, stainless-steel-based or nickel-chromium-based alloys.

The combustors used in the embodiments according to the present invention may be any kind of combustor operable to combust the mixture of air and fuel to produce hot gas. It may be a simple can type combustor or a combustor with a more complicated structure. It may be cannular, annular or double annular combustor. The combustors, preferably, comprise a fuel injection and an ignition system operable to combust the mixture of air and fuel. Preferably the amount of fuel injected by the fuel injection system can be controlled by the control system of the gas turbine. The fuel injection system may, e.g., be a pressurized fuel injection system having a spraying system with spray nozzles through which the fuel is being pumped with pressure. If the fuel used in the combustor requires utilization of the atomizing air or other supporting mechanisms in order to achieve controllable and efficient combustion, also these may be included in the combustor. The fuel injection system may include one or several valves in series or in parallel for controlling the flow of the fuel.

The combustors may also include an externally fired combustor in which case the heat generated by it is transferred to the pressurized air from the first compressor using a heat exchanger integrated into or installed in connection with the externally fired combustor. Accordingly, the pressurized air raises in temperature on its way towards the first turbine. For instance, when the fuel utilized is unsuitable for use in gas turbines, externally fired combustor may be preferred to prevent harmful particles entering the gas turbine process.

The fuel injected may be controlled based on the desired amount of power injected to the electrical grid or to any load in electrical connection with the gas turbine. The fuel injection may be controlled based on other parameters as well such as, e.g., voltage, current, temperature, pressure or mass flow. The combustor may also be of the variable geometry type. Variable geometry type of combustor may include an actuator with which the geometry of the combustor may be altered. The combustor may be constructed by using variety of materials being able to withstand the elevated temperatures and pressures occurring in the gas turbine process. These materials may be, e.g. but not limited to, nickel- or cobalt-based alloys. Also ceramic materials may be used in the combustors. There can also be various thermal barrier coating materials serving as an insulating layer to reduce the underlying metal base temperatures.

The control system, preferably, includes electronics and power electronic devices capable of controlling the torque and rotational speed of both of the electrical generators. The control system may include frequency converters for supplying the alternating current from the electrical generators to the load or may include rectifiers for the generators to convert the alternating current (AC) generated by the generators, in case of AC generators, into direct current (DC) and then an inverter or inverters to convert the DC into AC with the same frequency as, for example, in the electrical grid or an AC load or a stand-alone electrical load such as an electrical supply system of a hospital, an industrial plant or a residential load. AC current generated by electrical generators G1, G2 may thus be supplied to the load 200 via elements such as described above and not directly fed to the load. The characteristics of the AC may also change before being injected to the load. The control system may be able to receive information from the sensors arranged to measure thermodynamic parameters of the system such as temperatures and pressures and/or electrical parameters such as currents and voltages of the generators, power electronic circuits, parameters of the auxiliary systems or voltages and currents in the electrical grid or stand-alone electrical load into which the electrical power generated by the electrical generators G1, G2 of the gas turbine is being injected. The control system may include feedback loops, feed-forward paths and may be based on some of the variety of control methods such as, e.g., scalar volts-per-Hertz control, vector control also known as field-oriented control or direct torque control.

The control system may include, e.g., a central processing unit (CPU), a memory element such as, for example, Random-Access Memory (RAM), and a communication unit. The control software such as control algorithms are being stored in the memory and performed by the CPU. The communication unit, which may be utilized to send and/or receive data to/from an external system, may comprise an antenna and/or a communication port for wired communication technology, e.g. Ethernet or other local area network (LAN) interface. In case of wireless communication, the receiver may utilize e.g. radio frequency technologies such as wireless local area network (WLAN), Global System for Mobile Communication (GSM), Third Generation (3G), Long Term Evolution (LTE) technologies, Fourth Generation (4G).

According to some embodiments of the present invention, the electrical generators may be identical or, alternatively, they may be different types of electrical generators. The electrical generators according to the embodiments of the present invention may be of synchronous or asynchronous type. The generators may be DC generators, permanent magnet generators, induction generators, doubly-fed induction generators or any other kinds of generators operable to convert mechanical energy of the rotating axis into electrical energy. The number of phases of the generators may, preferably be three, but may also be two in case of DC generators, or, e.g., six. Also, the generators may have wye or delta connection and be either grounded or ungrounded.

The gas turbine arrangement according to an embodiment of the present invention is shown schematically in FIG. 1 including some optional elements marked with dashed lines. The elements of the gas turbine in FIG. 1 and their primary purposes may, in general terms, be described as follows. The low pressure compressor, i.e., the second compressor C2, and the high pressure compressor, i.e., the first compressor C1 increase the pressure of the used gas, typically air, flowing through them. The intercooler, i.e., the second heat exchanger 15, if any, may be used to transfer some of the heat from the air to a cooling medium. In the intercooler 15, if any, the cooling medium transferring some of the heat from the air is being fed from an external source (not shown in FIG. 1).

The recuperator, i.e., the first heat exchanger 14, if any, is utilized to pre-heat the air by utilizing hot gas coming from the low pressure turbine, i.e., the second turbine T2. In the main combustor, i.e. the first combustor Comb1, the pressurized air is being mixed with fuel and heat is being released in the combustion process, in case of a typical combustor, thus heating the mixture of air and fuel generating hot gas. In the second combustor Comb2, if any, the gas from the high pressure turbine, i.e., the first turbine T1 is being mixed with fuel and heat is being released in the combustion process, in case of a typical combustor, thus heating the mixture of gas from the first turbine T1 and fuel. In the high pressure turbine T1 and in the low pressure turbine T2, the hot gas expands and produces mechanical power to rotate the electrical generators, i.e., the first generator G1 and the second generator G2, respectively, and the first and the second compressor C1, C2, respectively. The high pressure spool, i.e., the first spool 10 includes the high pressure shaft, i.e., the first shaft 11, the high pressure compressor C1 and the high pressure turbine T1. The low pressure spool, i.e., the second spool 12 includes the low pressure shaft, i.e., the second shaft 13, the low pressure turbine T2 and the low pressure compressor C2.

Figure 2:
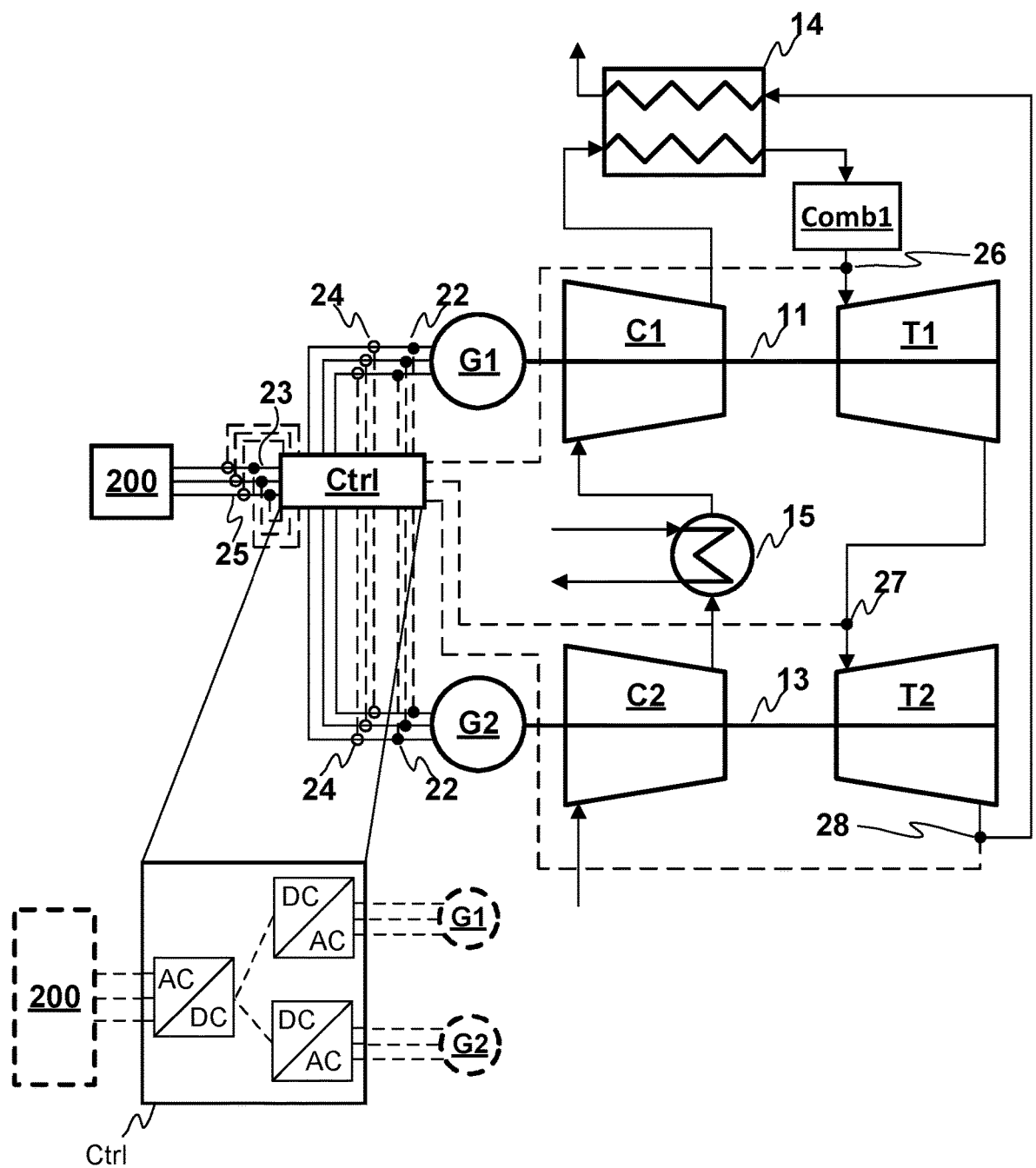
FIG. 2 illustrates schematically a gas turbine arrangement according to a preferable embodiment of the present invention.

In FIG. 2, a preferable embodiment of the present invention is shown, wherein the air coming into the system, i.e. the inlet gas, is being pressurized by the low pressure compressor C2. Then the pressurized air is being fed into the intercooler 15. The intercooler 15 decreases the temperature of the air by utilizing cooling medium such as, e.g., water to remove some of the heat from the air. Then the air is being fed into the high pressure compressor C1 which further increases the pressure of the air. Next, the air coming from the high pressure compressor C1 is then being fed into the recuperator 14 in which the air is being pre-heated by utilizing the hot exhaust gases, or further expanded gas with elevated temperature, coming from the low pressure turbine T2. After the recuperator 14, the pre-heated air is being fed into the main combustor Comb1 in which the pre-heated air is being mixed with fuel and combusted in order to heat the mixture of the pre-heated air and fuel to produce hot exhaust gases. The exhaust gases are then fed into the high pressure turbine T1 in which the exhaust gases are being expanded and produce mechanical power to rotate the high pressure compressor C1 and the first generator G1. Then the exhaust gases are further being fed into the low pressure turbine T2 in which the exhaust gases are being further expanded and produce mechanical power to rotate the low pressure compressor C2 and the second generator G2. After that the exhaust gases are being fed to the recuperator 14 after which the exhaust gases are being emitted from the gas turbine.

Furthermore, in FIG. 2, some examples of the measurements are shown which may be included into the arrangement according to a preferable embodiment or in any embodiment of the present invention. There may also be other measurements utilized as well. The examples of the measurements are shown with dashed lines. As can be seen in FIG. 2, there may be measurements of the output voltages 22 and currents 24 of the generators G1 and G2 as well as measurements from the side of the load 200 such as, e.g., electrical grid voltages 23 and currents 25. There may also be additional measurements of the electrical parameters inside the control system Ctrl such as input and output voltages and/or currents of the converters and inverters, if utilized in the embodiment. The thermodynamic parameters such as, e.g., the high pressure turbine inlet temperature 26 may be measured as well as the low pressure turbine inlet temperature 27 and the low pressure turbine outlet temperature 28, i.e. the inlet temperature of the recuperator in the embodiment in FIG. 2. All of the measurements may be fed to the control system Ctrl in order to monitor and/or control the operation of the gas turbine plant.

The first compressor C1 and the first turbine T1 may, preferably, be mounted on the first shaft 11 in such a way that they are in close proximity from each other. The first generator G1 may then be mounted on either side of this compressor-turbine pair on the first shaft 11. Also, the second compressor C2 and the second turbine T2 may, preferably, be mounted on the second shaft 13 in such a way that they are in close proximity from each other. The second generator G2 may then be mounted on either side of this compressor-turbine pair on the second shaft 13. When the elements are being in close proximity the pressure and heat losses may be minimized and the structure may be made compact. The first generator G1 may also be mounted in between the first compressor C1 and the first turbine T1. This may be the case for the second generator G2, the second compressor C2 and the second turbine T2 mounted on the second shaft 13 as well.

Figure 3A:
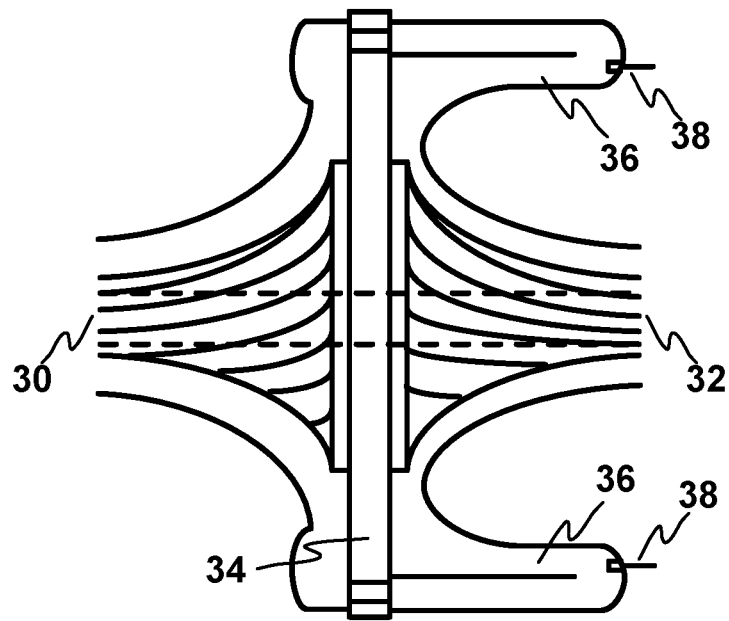
FIG. 3 illustrates schematically a planar element arranged between a compressor and a turbine utilized in an embodiment of the present invention.

In FIG. 3a, in case in which the compressors and turbines are mounted in close proximity from each other, a planar element 34 is shown that may be arranged between a compressor 30 and a turbine 32 according to embodiments of the present invention. In practical circumstances the close proximity may be realized disposing the compressor 30 and the turbine 32 adjacent to each other substantially separated only by the planar element 34. In these cases, an electrical generator may not be arranged between the compressor and the turbine. The plane defined by the planar element may be arranged to be perpendicular relative to the longitudinal axis of the shaft of the corresponding spool. The planar element may have, for example, a width from about 1 centimeter to about 20 centimeters. This also concerns embodiments including the recuperator 14 although not shown in FIG. 3a for clarity reasons. The structure enables minimization of the path of the gas from the compressor 30 to the turbine 32 via the combustor 36. This will lead to lower pressure and heat losses.

On one side of the planar element 34, there is air coming from the compressor 30 and on the other side the heated gas leaving the combustor 36 to which the air is coming and to which the fuel is injected, e.g., from a fuel injection nozzle 38. This causes high temperature gradient over the planar element 34. In case of a spool to which the exhaust gases are coming from a turbine of another spool, there is air coming from the compressor 30 on the one side and the heated gas leaving a turbine of another spool on the other side. In this case too, the temperature gradient is high. The material of the planar element may be any material withstanding the high temperature gradient present in the gas turbines, such as e.g., nickel-chromium alloy, in order to separate the hot exhaust gases on the turbine side 32 from the cooler air on the compressor side 30.

Figure 3B:
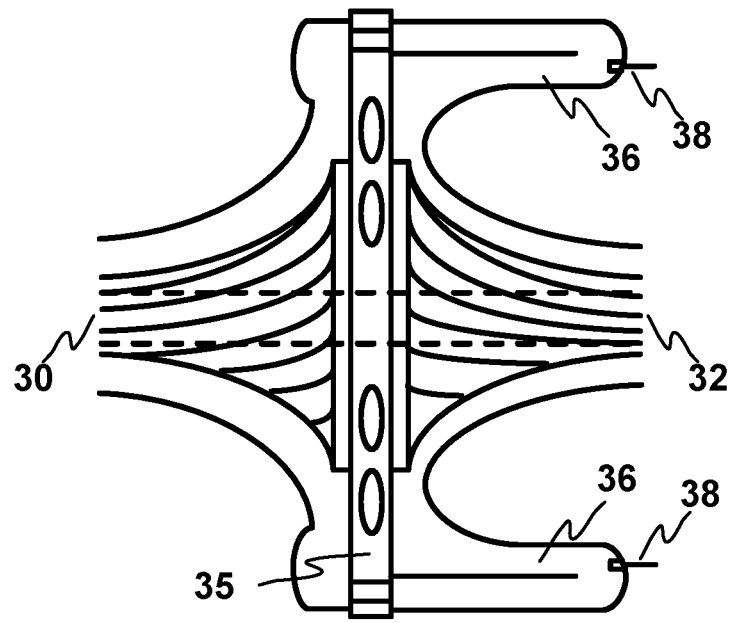

The planar element 34 may also be partially hollow, i.e. a partially hollow planar element 35 as shown in FIG. 3b, so that air can flow inside the partially hollow planar element 35 thus cooling down the element and providing good heat insulating properties. If the partially hollow planar element 35 is being used, it may be utilized in either one or in both of the spools.

Figure 4:
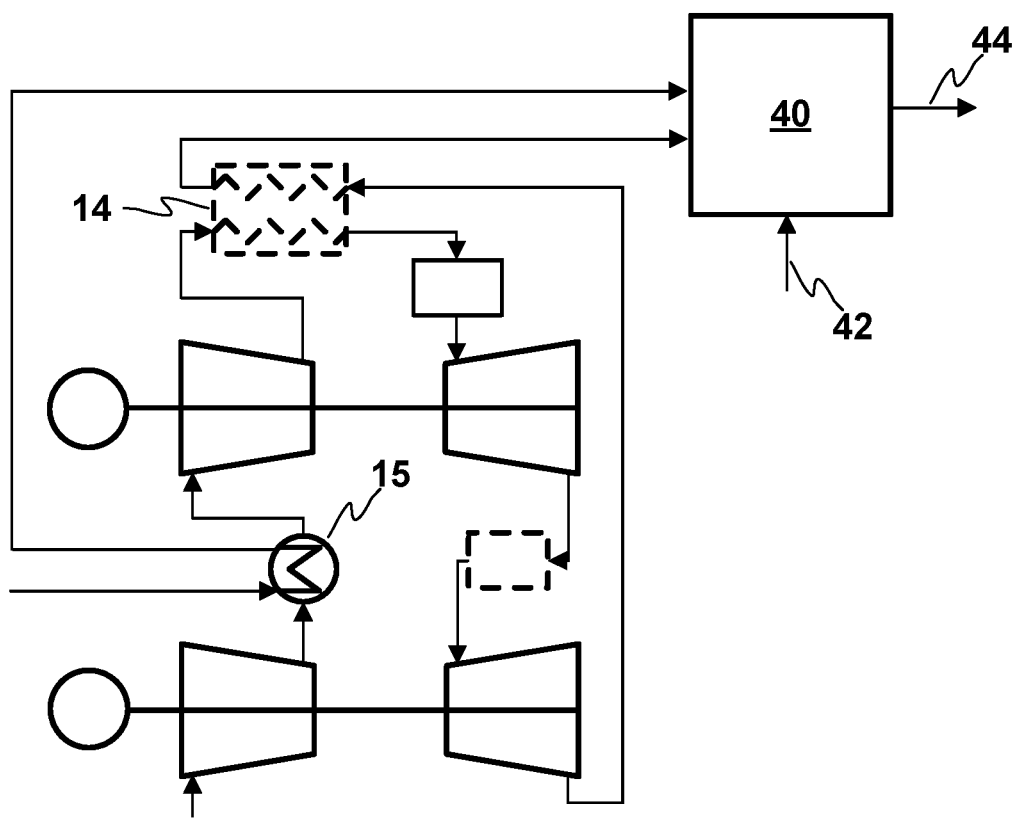
FIG. 4 illustrates a gas turbine plant arranged in fluid communication with an external process utilizing heat from the gas turbine according to an embodiment of the present invention.

In FIG. 4, the gas turbine arrangement is shown in fluid communication with an external process 40. The external process may be any heat utilization in general such as, e.g., a steam boiler, a space heating system, a duct burner or any other burner utilizing pre-heated gases. The external process may utilize the cooling medium coming from the intercooler. In case of, e.g., a duct burner there is also fuel 42 coming from an external source. As a product of the process 44, there may be, e.g., steam.

According to an embodiment of the present invention, the intercooler 15, the recuperator 14 and the reheat combustor Comb2, also shown in FIG. 1, all of which may be considered optional elements, are omitted. In this embodiment, the air coming into the system is being pressurized first by the low pressure compressor C2. Then the air is being fed into the high pressure compressor C1 in order to be pressurized further. Then the pressurized air is being fed into the main combustor Comb1 in which the pressurized air is being mixed with fuel in order to produce heat by combustion of the mixture of air and fuel. After the main combustor Comb1, the exhaust gases are fed into the high pressure turbine T1 in which the exhaust gases are being expanded and mechanical power is produced and the high pressure compressor C1 and the first generator G1 are being rotated to compress air and to produce electrical power, respectively. Then, the exhaust gases are fed into the low pressure turbine T2 in which the exhaust gases are further being expanded to produce mechanical power and to rotate the low pressure compressor C2 and the second generator G2 to compress air and to produce electrical power, respectively. After that the exhaust gases are emitted from the gas turbine.

According to an embodiment of the present invention, the recuperator 14 and the reheat combustor Comb2, also shown in FIG. 1, both of which may be considered optional elements, are neglected. In this embodiment, the air coming into the system is being first pressurized by the low pressure compressor C2. Then the air is being fed to the intercooler 15 which removes some of the heat from the air, therefore, lowering the temperature of the air. Then the air is being fed to the high pressure compressor C1. Then the pressurized air is being fed into the main combustor Comb1 in which the pressurized air is being mixed with fuel in order to produce heat by combustion of the mixture of air and fuel. After the main combustor Comb1, the exhaust gases are fed to the high pressure turbine T1 in which the exhaust gases are being expanded and mechanical power is produced and the high pressure compressor C1 and the first generator G1 are being rotated to compress air and to produce electrical power, respectively. Then, the exhaust gases are further fed into the low pressure turbine T2 in which the exhaust gases are further being expanded to produce mechanical power and to rotate the low pressure compressor C2 and the second generator G2 to produce electrical power. After that the exhaust gases are emitted from the gas turbine.

According to an embodiment of the present invention, the intercooler 15 and the reheat combustor Comb2, also shown in FIG. 1, both of which may be considered optional elements, are neglected. In this embodiment, the air coming into the system is being pressurized first by the low pressure compressor C2. Then the air is being fed to the high pressure compressor C1 after which the air is being fed into the recuperator 14. The recuperator 14 transfers some of the heat from the exhaust gases coming from the low pressure turbine T2 to the air thus pre-heating the air before the air is being fed to the main combustor Comb1 in which the pre-heated air is being mixed with fuel in order to produce heat by combustion of the mixture of air and fuel. After the first combustor the exhaust gases are fed to the first turbine T1 in which the exhaust gases are being expanded and mechanical power is produced and the high pressure compressor C1 and the first generator G1 are being rotated to compress air and to produce electrical power, respectively. Then, the exhaust gases are further fed into the low pressure turbine T2 in which the exhaust gases are further being expanded to produce mechanical power and to rotate the low pressure compressor C2 and the second generator G2 to produce electrical power. After that the exhaust gases are being fed to the recuperator 14 after which the exhaust gases are being emitted from the gas turbine.

According to an embodiment of the present invention, the arrangement includes an auxiliary system comprising an energy source which can be utilized in predefined (pre-thought) abnormal operating conditions such as, e.g. in case when there is a sudden surprising interruption in the electrical grid such as in case of loss-of-mains or in case of a planned maintenance outage, in order to safely and in controlled manner ramp the system up or down or to control the power injected to the load 200. In these cases, the control system of the gas turbine plant can be operated by utilizing the energy from the energy source of the auxiliary system. This energy source may be, e.g. but not limited to, a battery or a bank of batteries, a supercapacitor or a fuel cell system. By utilizing the auxiliary system, the control of the gas turbine remains operational and is able, e.g., to shut down the system safely or may run the system in an islanding condition.

According to various embodiments, active magnetic bearings may be used on each of the shafts 11, 13 of the spools 10, 12. There may be one or more than one active magnetic bearing coupled to each one of the shafts. The active magnetic bearings may be used to determine the rotational speed of at least one of the shafts. The determined speed may be used in the control system to control the rotational speeds of shafts by the electrical generators.

According to various embodiments of the present invention, most of the total output power supplied to the load 200 in the form of electrical and rotational power is generated by the electrical generators G1, G2 in the form of electrical energy. The total output power refers herein to the sum of the electrical power and the rotational power supplied to the load 200, wherein the load 200 is external with respect to the arrangement, by the arrangement. The total output power as defined herein does not include thermal output power such as energy exhausted out of the arrangement through an exhaust pipe, or thermal losses of the arrangement. According to an embodiment, at least 60 percent or, advantageously, at least 80 percent of the total output power supplied to the load 200 in the form of electrical and rotational power is outputted by the electrical generators G1, G2 in the form of electrical energy.

The load 200 herein refers to a load 200 that is external to the arrangement such as an electrical grid or a stand-alone electrical load such as an electrical supply system of, for example, a hospital or an industrial plant or a residential load. or. In marine based gas turbine plants load 200 may be an electrical supply system of a ship and/or an electrical motor which is a part of a marine propulsion system of a ship.

The electrical generators G1, G2 are, therefore, arranged to produce the primary output power of the arrangement supplied continuously or on average to the load 200, which is external to the arrangement, by the arrangement in the form of electrical energy, and not to act only as an auxiliary power source or only to control the operation of the arrangement. Continuously or on average supplied power to said load 200 external with respect to the arrangement refers herein to typical operating conditions such as in nominal operating conditions or at a part-load conditions excluding power produced intermittently, momentarily or for short periods of time, e.g., for a short power boost. However, the electrical generators G1, G2 may be used also in controlling the operation of the gas turbine arrangement in conjunction with the control of the amount of heat generated in the first combustor Comb1 as well as in second combustors Comb2, if any.

According to an embodiment, a part of the electrical output power of the electrical generators G1, G2 may be used to operate the gas turbine arrangement, i.e., to self-consumption of the arrangement. The self-consumption may be, for example, the power needed for the control system or the active magnetic bearings. However, still most of the total output power supplied to the load 200, being external with respect to the arrangement, by the arrangement. According to various embodiments at least 60 percent or, preferably, at least 80 percent of the output power supplied to the load 200 is produced by the electrical generators G1, G2 in the form of electrical energy. Less than 40 percent or, preferably, less than 20 percent of the total output power supplied to the load 200 in the form of electrical and rotational power, that is, e.g., rotational energy of a shaft 11, 13, may come from other sources, such as from an additional turbine or a rotatable device, such as a fan or a pump, in fluid communication with the arrangement.

According to various embodiments of the present invention, the nominal power and/or rotational speed ratings of the generators may differ 10 or 15 percent from each other at most relative to the nominal power of the generator with higher nominal power and still fall under the concept of substantially equal rating disclosed herein. In certain cases, the gas turbine process may be designed in such a way that it is beneficial to have slightly higher difference in the power ratings of the generators in order to optimize the operation of the system and, therefore, the limit for the difference in the ratings may, depending on the case, thus also be 15 percent.

According to an embodiment, the nominal power rating of an electrical generator G1, G2 may be 30-1500 kilowatts. According to an embodiment, the nominal rotational speed rating of an electrical generator G1, G2 may be 10000-

120000 revolutions per minute. According to various embodiments, the maximum value of the turbine inlet temperature of the highest pressure turbine T1 may be 600-1500 degrees of Celsius, preferably 750-1250 degrees of Celsius.

According to various embodiments, the rotational speeds of the rotating parts of the electrical generators G1, G2, that is their rotors, may not differ more than 30 percent relative to the rotational speed of the generator coupled to the spool rotating faster.

According to an embodiment, the electrical powers outputted by the electrical generators G1, G2 may, preferably, be such that the difference between the electrical powers of the generators G1, G2 relative to the nominal power rating of one of the electrical generators may not exceed 60 percent. If the nominal power ratings differ within the range in accordance with the present invention, then the electrical powers outputted by the electrical generators G1, G2 may not differ more than 60 percent relative to the nominal power rating of the electrical generator with higher nominal power rating.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A controllable multi-spool gas turbine arrangement for generating an electrical power to supply to a load, the arrangement comprising:
   two spools including:
      a second spool including a second shaft, where a second compressor, for compressing an inlet gas into a compressed gas, and a second turbine are both mounted on the second shaft, and
      a first spool including a first shaft, where a first compressor, for further compressing the compressed gas from the second compressor, and a first turbine are both mounted on the first shaft,
   wherein at least one compressor of the first and second compressors and at least one turbine of the first and second turbines, mounted together on at least one shaft of the first and second shafts respectively, are separated only by a planar element arranged between the at least one compressor and the at least one turbine, such that a plane defined by the planar element is perpendicular to a longitudinal axis of the at least one shaft, and the planar element is a partially hollow planar element so that an air can flow inside the partially hollow planar element for cooling down the partially hollow planar element and for providing a heat insulation between the at least one compressor and the at least one turbine;
   a first combustor configured to combust or react a mixture of a fuel with the further compressed gas from the first compressor, said further compressed gas is preheated in a first heat exchanger, so that a resultant gas, generated in the first combustor via a combustive or reactive process, is expanded in the first turbine to produce a mechanical power,
   wherein the second turbine is arranged to receive the expanded gas from the first turbine and to further expand the expanded gas to produce a second mechanical power,
   the first spool and the second spool are rotated independently of each other;
   two generators comprising:
      a first generator directly coupled to the first shaft to be rotatably driven to rotate at a same first speed as the first shaft and to generate a first alternating electrical current provided to the load, and
      a second generator directly coupled to the second shaft to be rotatably driven to rotate at a same second speed as the second shaft and to generate a second alternating electrical current provided to the load; and
   a control system, configured to control operations of the two spools and electrical outputs corresponding to the first and second alternating electrical currents of the first and second generators for controlling the electrical power provided to the load, wherein the controlling comprises a substantially independent individual control of the two generators, wherein the first generator and the second generator have equal nominal power ratings and rotating parts of the first generator and the second generator have equal nominal rotational speed ratings.

2. The arrangement according to claim 1, wherein the first heat exchanger is arranged to receive said further expanded gas from the second turbine, the first heat exchanger causing heat transfer from said further expanded gas to said further compressed gas so as to pre-heat said further compressed gas prior to the combustive or reactive process in the first combustor.

3. The arrangement according to claim 1, wherein the arrangement further comprises:
   a second heat exchanger arranged to receive said compressed gas from the second compressor and to receive a cooling medium from an external source so as to decrease a temperature of said compressed gas prior to transferring said compressed gas to the first compressor.

4. The arrangement according to claim 3, wherein the arrangement further comprises:
   a heat utilization process arranged in a fluid communication with the controllable multi-spool gas turbine arrangement, wherein the cooling medium from the second heat exchanger, if comprising water, is injected to the heat utilization process and utilized for heating.

5. The arrangement according to claim 1, wherein the arrangement further comprises:
   a second combustor configured to combust or react a further mixture of a fuel with the expanded gas from the first turbine to re-heat the expanded gas via a combustive or reactive process in the second combustor for transferring the re-heated expanded gas into the second turbine.

6. The arrangement according to claim 5, wherein the first combustor and the second combustor are externally fired combustors.

7. The arrangement according to claim 1, wherein the first combustor comprises an ignition system and a fuel injection system.

8. The arrangement according to claim 1, wherein one or more of the first compressor and the second compressor are centrifugal compressors.

9. The arrangement according to claim 1, wherein one or more of the first turbine and the second turbine are radial turbines.

10. The arrangement according to claim 1, wherein the first generator and the second generator have equal nominal power ratings but differ in instantaneous output powers by at most ten percent from each other during operation of the first and second generators.

11. The arrangement according to claim 1, wherein the control system comprises two rectifiers and an inverter, wherein each one of the two rectifiers is electrically coupled between a respective one of the two generators and the inverter, wherein the two rectifiers are arranged to, respectively, convert the first alternating current and the second alternating current from the two generators to a direct current for providing the direct current to the inverter, wherein the inverter is further coupled to the load for converting the direct currents from the rectifiers to another alternating current and for providing said another alternating current to the load.

12. The arrangement according to claim 1, wherein a total output power provided to the load is comprised of both rotational power and electrical power and wherein the electrical power comprises at least 60 percent of the total output power provided to the load and is generated by the first and second generators.

13. The arrangement according to claim 1, wherein the first and second generators are identical.

\* \* \* \* \*